US006856046B1

(12) United States Patent
Scarlett et al.

(10) Patent No.: US 6,856,046 B1
(45) Date of Patent: Feb. 15, 2005

(54) PLUG-IN DEVICE DISCRIMINATION CIRCUIT AND METHOD

(75) Inventors: Shawn W. Scarlett, Palo Alto, CA (US); Steven E. Austin, Penn Valley, CA (US)

(73) Assignee: Analog Devices, Inc., Norwood, MA (US)

( * ) Notice: Subject to any disclaimer, the term of this patent is extended or adjusted under 35 U.S.C. 154(b) by 488 days.

(21) Appl. No.: 10/094,398

(22) Filed: Mar. 8, 2002

(51) Int. Cl.[7] ........................ H01H 47/00; H04M 11/00; H01R 13/66

(52) U.S. Cl. ......................... 307/125; 379/99; 379/388; 439/620; 439/668

(58) Field of Search ................................ 307/121, 125, 307/126, 127; 439/620, 668, 669; 379/93, 99, 88, 100, 90, 387–399; 455/78, 89, 92; 381/92, 61, 28, 716, 787

(56) References Cited

U.S. PATENT DOCUMENTS 4,367,374 A * 1/1983 Serrano ...................... 379/442
4,491,694 A * 1/1985 Harmeyer ................... 379/442
4,548,447 A * 10/1985 Dinsmore .................... 439/43
5,465,240 A * 11/1995 Mankovitz ...................... 369/1
5,533,105 A * 7/1996 Brown et al. ............ 379/93.05
5,625,679 A * 4/1997 Gutzmer .................. 379/93.37
5,715,321 A * 2/1998 Andrea et al. ................ 381/92
6,185,627 B1 * 2/2001 Baker et al. .................... 710/1
6,343,126 B1 * 1/2002 Stelman ................. 379/399.01

* cited by examiner

*Primary Examiner*—Rajnikant B. Patel
(74) *Attorney, Agent, or Firm*—Koppel, Jacobs, Patrick & Heybl

(57) ABSTRACT

A plug-in device discrimination circuit is connected to the contacts of a jack. When a plug-in device is plugged into the jack, the circuit discerns the type of device it is, thereby enabling proper interface circuitry to be connected to the plug-in device. The discrimination circuit includes a comparison circuit, a switching network, and a controller. The controller operates the switching network to connect the comparison circuit to the jack contacts. When so connected, the comparison circuit compares the electrical characteristics of at least two of the circuits contained within the plug-in device, and produces an output which varies with the results of the comparison. The controller receives the output of the comparison circuit and may configure additional circuitry to present an appropriate interface to the plug-in device.

24 Claims, 5 Drawing Sheets

PLUG-IN DEVICE DISCRIMINATION CIRCUIT AND METHOD

BACKGROUND OF THE INVENTION

1. Field of the Invention

This invention relates to the field of discrimination circuits, and particularly to circuits and methods for discriminating between various types of devices that might be plugged into a particular jack.

2. Description of the Related Art

A number of different portable electronic devices might utilize the same type of connector plug to connect to interface circuitry within a separate unit. For example, many stereo headphones and telephone headsets use a common 3-contact plug, which mates with a standard 2.5 mm 3-contact jack as might be found mounted, for example, on a laptop computer, a cell phone, or a CD player. For stereo headphones, two of the plug contacts connect to respective sound transducers and the third plug contact serves as a common ground. For the telephone headset, one plug contact connects to a microphone, one contact connects to a sound transducer, and the third contact serves as a common ground.

Since such devices, referred to herein as "plug-in devices", share a common plug type, either one might be plugged into a particular jack. In some cases, the interface circuitry connected to the jack is required to accommodate both types of devices. For example, a laptop computer which includes a 2.5 mm 3-contact jack might be required to present a proper interface for either a telephone headset or stereo headphones.

In such cases, it might be desirable for the interface circuitry to know what type of device is plugged into its jack, so that a proper interface can be presented to the plug-in device. This would enable the interface circuitry to be configured properly for the plug-in device, and may avoid damage to the connecting circuitry, the plug-in device, or both.

SUMMARY OF THE INVENTION

A plug-in device discrimination circuit and method are presented which fulfill the needs described above. The discrimination circuit is connected to the contacts of a jack, and, when a plug-in device is plugged in, discerns which type of device it is, thereby enabling proper interface circuitry to be presented to the plug-in device.

The discrimination circuit is connected to the contacts of a particular jack, and includes a comparison circuit, a switching network, and a controller. It is presumed that a plug-in device plugged into the jack contains at least two circuits—such as a microphone and a sound transducer (for a telephone headset) or two sound transducers (for stereo headphones). The controller operates the switching network to connect the comparison circuit to the jack contacts. When so connected, the comparison circuit is arranged to compare the electrical characteristics of at least two of the plug-in device's circuits, and to produce an output which varies with the results of the comparison.

The controller is preferably a state machine which is further arranged to receive the output of the comparison circuit and to configure interface circuitry such that an appropriate interface is presented to the plug-in device. For example, if the discrimination circuit determines that the plug-in device is stereo headphones, the controller can cause a pair of driver circuits to be connected to the jack contacts to provide appropriate driving signals to the headphone's sound transducers. Similarly, determining that the plug-in device is a telephone headset results in the connection of a driver circuit and an amplifier to the jack contacts, to drive the headset's earphone and to amplify the headset's microphone, respectively.

Further features and advantages of the invention will be apparent to those skilled in the art from the following detailed description, taken together with the accompanying drawings.

DETAILED DESCRIPTION OF THE INVENTION

Figure 1:
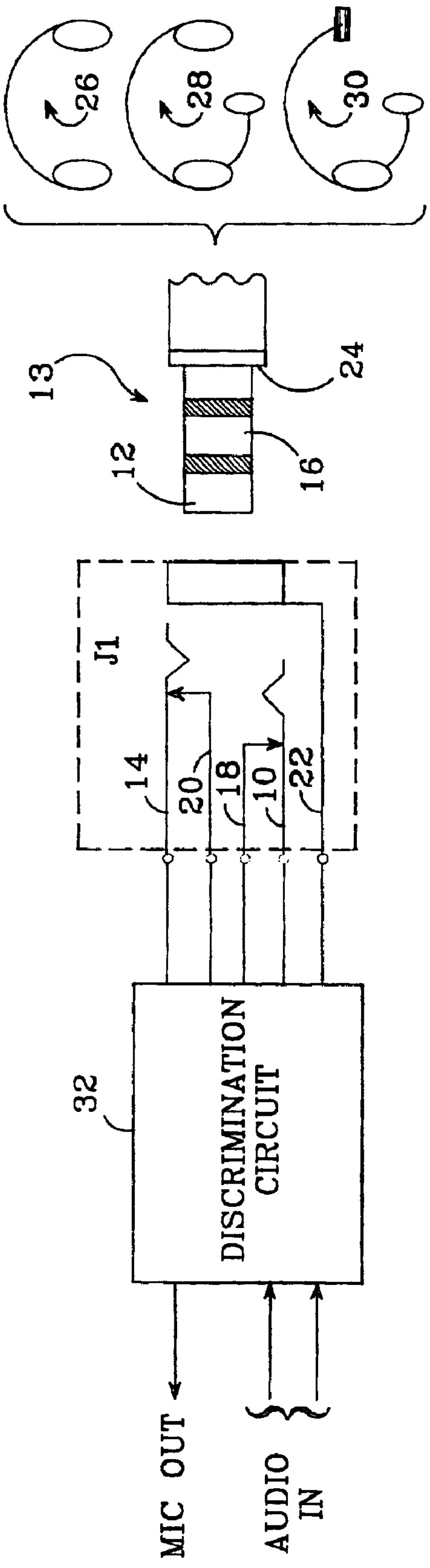
FIG. 1 is a block diagram illustrating the basic principles of the invention.

The basic principles of a plug-in device discrimination circuit in accordance with the present invention are illustrated in FIG. 1. A jack J1 has at least 3 contacts, and typically has 4 contacts: a contact 10 which contacts the "tip" 12 of a corresponding plug 13 inserted into J1, a contact 14 which contacts the "ring" portion 16 of the plug, and contacts 18 and 20 which are in contact with contacts 10 and 14, respectively, except when a plug is inserted; which open-circuits contacts 18 and 20. The metal body of J1 provides a common contact 22, which contacts a corresponding common portion 24 on plug 13 when the plug is inserted; common contact 22 is typically connected to circuit ground, but may also be at a non-zero potential. J1 may be, for example, a standard 2.5 mm 3-contact jack or a 3.5 mm 4-contact jack.

A number of different portable devices might connect to interface circuitry contained within the unit to which J1 is mounted, using the type of plug that mates with J1; such devices are referred to herein as "plug-in devices". For example, a pair of stereo headphones 26, a telephone headset 28 with left and right sound transducers and a microphone, and a phone headset 30 with a single sound transducer and a microphone, might all employ a plug designed to mate with jack J1. However, to operate properly, each of these devices requires that different interface circuitry be connected to the jack contacts. That is, when stereo headphones 26 are plugged into J1, drivers suitable for driving the headphones' left and right sound transducers must be connected to jack contacts 10 and 14 (and contact 22 must be connected to ground or a fixed non-zero potential). But when headset 30 is plugged into J1, a driver must be connected to jack contact 10 and a microphone amplifier must be connected to lack contact 14 (or vice versa, depending on the particular headset).

To accommodate these different types of plug-in devices, a discrimination circuit 32 is connected to J1's contacts. The function of discrimination circuit 32 is to determine the type of device plugged into J1. Once the plug-in device type is determined, an appropriate interface, such as drivers providing AUDIO IN signals or an amplifier receiving a MIC OUT signal, can be presented to the jack contacts. In this way, a single jack can be used to accommodate a number of different types of plug-in devices. Furthermore, by presenting an appropriate interface to the plug-in device, damage that might otherwise occur to the plug-in device or to circuitry connected to the jack contacts can be avoided.

The discrimination circuit is useful with plug-in devices which contain at least two circuits, such as the left and right sound transducers of a pair of stereo headphones, or the microphone and sound transducer of a telephone headset. Each of the plug-in device's circuits has one or more associated electrical characteristics which can be measured via the jack contacts (when the device is plugged into the jack). For example, the resistances across a headphone's sound transducers can be determined by applying currents to jack contacts 10 and 14 and measuring the resulting voltages between each jack contact and the common contact. The discrimination circuit operates by comparing an electrical characteristic of one of the plug-in device's circuits with the same characteristic of another of the device's circuits; for example, the resistance of a headphone's left sound transducer is compared with the resistance of its right sound transducer. The results of this comparison yield information which allow the plug-in device to be identified. Once the device type is identified, interface circuitry can be presented to the jack contacts as appropriate.

Figure 2:
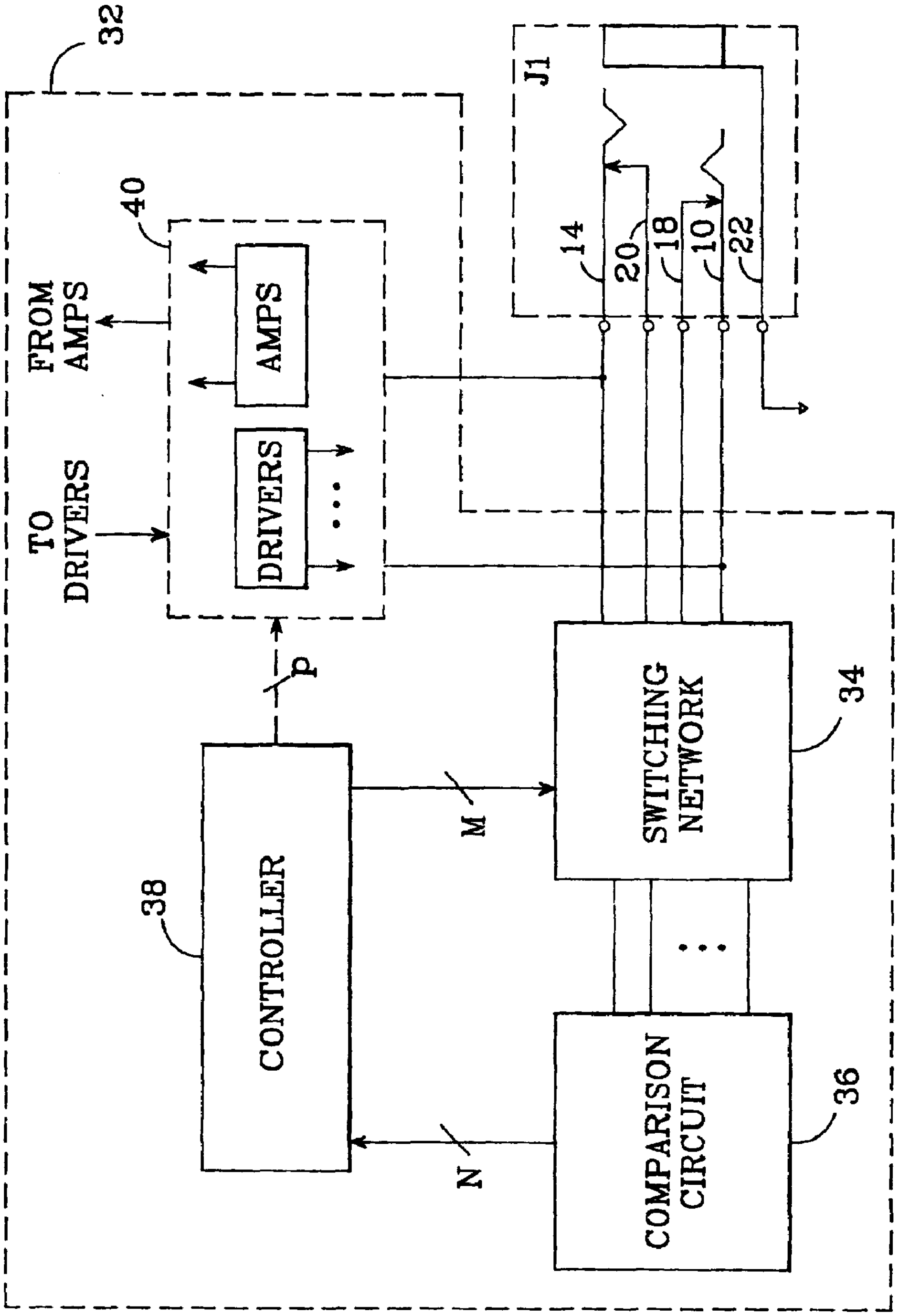
FIG. 2 is a block diagram of a plug-in device discrimination circuit in accordance with the present invention.

A more detailed diagram of the present discrimination circuit is shown in FIG. 2. Discrimination circuit 32 includes a switching network 34 which is connected to the jack contacts, a comparison circuit 36 which is connected to the switching network, and a controller 38 which is connected to switching network 34 via M lines, and to comparison circuit 36 via N lines.

In operation, controller 38 configures switching network 34 such that stimuli needed to obtain information about a particular electrical characteristic of the plug-in device's circuits are applied to the jack contacts. This causes signals which represent the characteristics of interest to appear at the jack contacts. These signals are provided to comparison circuit 36, which performs the comparison and produces an output which indicates the results of the comparison. This output is provided to controller 38, which can then configure interface circuitry 40 to present an appropriate interface to the plug-in device connected to J1.

The electrical characteristic compared by comparison circuit 36 is preferably resistance. However, the comparison circuit might also be arranged to compare other characteristics of the plug-in device's circuits, such as their impedance or conductance.

Figure 3:
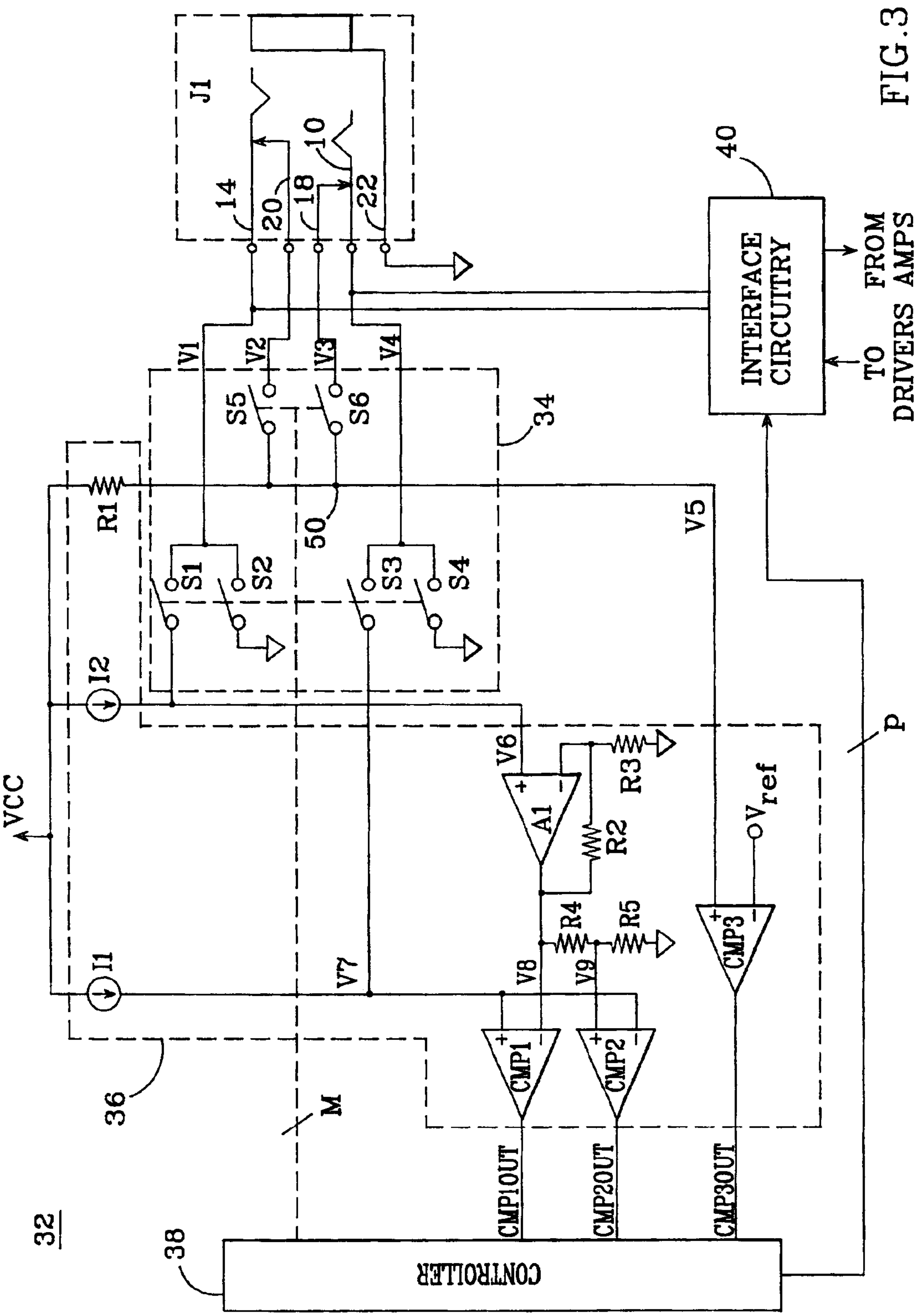
FIG. 3 is a schematic diagram of one possible implementation of a plug-in device discrimination circuit in accordance with the present invention.

A schematic diagram of one possible implementation of a discrimination circuit per the present invention is shown in FIG. 3. Switching network 34 comprises six controllable switches S1–S6: switches S1 and S2 are connected to jack contact 14, switches S3 and S4 are connected to jack contact 10, and switches S5 and S6 are connected to jack contacts 20 and 18, respectively. Comparison circuit 36 comprises a gain amplifier A1 with gain components R2 and R3, a resistive divider connected to the output of A1 comprising resistors R4 and R5, three comparators CMP1, CMP2, and CMP3, two current sources 11 and 12, and a resistor R1. The currents provided by 11 and 12 are preferably equal. The voltages developed at jack contacts 14, 20, 18 and 10 in response to 11 and 12 are identified as V1, V2, V3 and V4, respectively.

The state (open or closed) of each of switches S1–S6 is controlled by controller 38, via 6 control lines (i.e., M=6). Controller 38 preferably puts the discrimination circuit into an initial state which is designed to detect the insertion of a plug into jack J1. The controller does this by setting switches S1–S6 in accordance with Table 1, below:

TABLE 1

| | |
|---|---|
| S1 | open |
| S2 | closed |
| S3 | open |
| S4 | closed |
| S5 | closed |
| S6 | closed |

Closing S2 and S4 connects jack contacts 14 and 10 to circuit ground, respectively. For many standard jacks, contacts 20 and 18 are "normally closed", meaning that they are in contact with contacts 14 and 10, respectively, when no plug is inserted into J1. Therefore, when no plug is inserted into J1, normally-closed contacts 20 and 18 are in contact with contacts 14 and 10, and thus are also at ground potential. In this condition, V1=V2=V3=V4=0 volts.

The terminals on one side of switches S5 and S6 are connected to J1, with the terminals on the other side of S5 and S6 connected together at a node 50, and to a supply voltage VCC via a resistor R1. The voltage at node 50 is referred to herein as V5. With S5 and S6 closed and with V2 and V3 at ground, V5 is pulled down to ground. V5 is connected to the non-inverting input of a comparator CMP3, which receives a reference voltage $V_{ref}$ at its inverting input. $V_{ref}$ is made greater than 0 volts such that when V5=0, the output CMP3OUT of CMP3 is a logic low. CMP3OUT is fed to controller 38, which is arranged to interpret a low CMP3OUT as meaning that no plug is inserted into J1.

When a plug is inserted into J1, normally-closed jack contacts 20 and 18 are opened. This allows voltages V2, V3 and V5 to be pulled up to VCC via R1. $V_{ref}$ is made less than VCC such that when V5≈VCC, the output CMP3OUT of CMP3 is a logic high. Controller 38 is arranged to interpret this as meaning that a plug is inserted into J1. Once the insertion of a plug is detected, controller 38 sets switches S1–S6 in accordance with Table 2, below:

TABLE 2

| | |
|---|---|
| S1 | closed |
| S2 | open |
| S3 | closed |
| S4 | open |
| S5 | closed |
| S6 | closed |

Opening S2 and S4 and closing S1 and S3 causes currents 11 and 12 to be applied to jack contacts 10 and 14, respectively. As noted above, the plug-in device plugged into J1 contains at least two circuits, each of which is connected to a respective one of J1's non-common contacts when its plug is inserted in J1. Each plug-in device circuit has an associated electrical characteristic, information about which can be ascertained via connecting to the jack contacts. In this example, the electrical characteristic utilized by the discrimination circuit is the resistance of each plug-in device circuit. Thus, the resistance between non-common contact 10 and common contact 22 is compared with the resistance between non-common contact 14 and common contact 22.

The application of currents 11 and 12 enable the comparison to be made. The current 11 applied to jack contact 10 flows through one of the plug-in device circuits to ground, causing a voltage V7 to develop at the junction of I1 and S3. Similarly, the current 12 applied to jack contact 10 flows through another of the plug-in device circuits to ground, causing a voltage V6 to develop at the junction of 12 and S1.

Voltages V6 and V7 vary directly with the resistances of the two plug-in device circuits connected to jack contacts 14 and 10, respectively. Comparison circuit 36 compares V6 and V7 to determine whether the two resistances are about equal, or whether one is greater than the other. Making this determination enables the discrimination circuit to ascertain the type of device which is plugged into J1.

For example, for a pair of stereo headphones, the resistance between the tip of the plug and ground is defined by one sound transducer, and the other sound transducer defines' the resistance between the ring of the plug and ground. The two transducers have approximately the same resistance, so that the resistance between J1's tip contact (10) and ground is nearly equal to the resistance between J1's ring contact (14) and ground. Thus, when stereo headphones are plugged into J1, equal currents 11 and 12 produce nearly-equal voltages V7 and V6, respectively.

For the exemplary comparison circuit 36 shown in FIG. 3, the comparison is performed with a gain amplifier A1 and two comparators CMP1 and CMP2. Voltage V6 is presented to the non-inverted input of A1, which uses resistors R2 and R3 to provide a positive gain to V6 and thereby produce an output V8 which is always greater than V6. V8 is divided down with a resistive divider made from resistors R4 and R5 to produce a voltage V9; the divider resistors are chosen such that V9 is always less than V6.

Comparator CMP1 receives voltage V7 at its non-inverting input and voltage V8 at its inverting input, while comparator CMP2 receives voltage V7 at its inverting input and voltage V9 at its non-inverting input. When V6 and V7 are nearly equal, V7 will be lower than V8 and the output CMP1OUT of CMP1 will be a logic low. Similarly, V7 will be higher than V9 and the output CMP2OUT of CMP2 will also be a logic low. CMP1OUT and CMP2OUT are fed to controller 38, which is arranged to interpret the two logic lows as indicating that stereo headphones are plugged into J1. If desired, controller 38 can then signal interface circuitry 40 to connect respective driver circuits to jack contacts 10 and 14 in order to drive the headphone's left and right sound transducers.

The results of the comparison are different if the plug-in device is a telephone headset which has one sound transducer and a microphone, each of which is connected to a respective non-common contact on the device's plug. The discrimination circuit can distinguish a telephone headset from stereo headphones because the resistance of a microphone is much greater than that of the sound transducer.

Assume that the tip of a telephone headset's plug is connected to a sound transducer, and that the ring of the plug is connected to a microphone. Because the resistances of the two circuits are different, equal currents 11 and 12 will result in unequal voltages V6 and V7. The gain of A1 and the values of divider resistors R4 and R5 are arranged such that the unequal resistances will cause V7 to be either higher than V8 or lower than V9, depending on which circuit is connected to which jack contact. When the tip (jack contact 10) is connected to the sound transducer and the ring (jack contact 14) is connected to the microphone, the unequal resistances will result in voltage V7 being significantly lower than V6. A1's gain is set such that V7 is less than V8, causing CMP1OUT to be low. V7 is also less than V9, causing CMP2OUT to be high. Based on CMP1OUT and CMP2OUT, controller 38 determines that a sound transducer is connected to contact 10 and a microphone is connected to contact 14. Controller 38 can then signal interface circuitry 40 to connect a driver circuit to jack contact 10 and a microphone amplifier circuit to jack contact 14 in order to properly accommodate the telephone headset connected to J1.

Similarly, when the tip (jack contact 10) is connected to the microphone and the ring (jack contact 14) is connected to the sound transducer, the unequal resistances will result in voltage V7 being significantly greater than V6. A1's gain is set such that V7 is greater than V8, causing CMP1OUT to be high. V7 is also greater than V9, causing CMP2OUT to be low. Based on CMP1OUT and CMP2OUT, controller 38 determines that a microphone is connected to contact 10 and a sound transducer is connected to contact 14. Controller 38 can then signal interface circuitry 40 to connect a microphone amplifier circuit to jack contact 10 and a driver circuit to jack contact 14 in order to properly accommodate the telephone headset connected to J1.

After the discrimination circuit determines the type of plug-in device connected to J1, controller 38 sets switches S1–S6 in accordance with Tables 3, 4 or 5, below, to detect the removal of the plug from J1. If the plug-in device has been determined to be stereo headphones (CMP1OUT low, CMP2OUT low), the switches are set in accordance with Table 3:

TABLE 3

| | |
|---|---|
| S1 | open |
| S2 | open |
| S3 | open |
| S4 | open |
| S5 | closed |
| S6 | closed |

As noted above, when the plug-in device is stereo headphones, interface circuitry 40 connects respective driver circuits to jack contacts 10 and 14. As headphones are typically referenced to ground, the drivers' output voltages will be near ground. When the plug is removed from J1, normally-closed jack contacts 20 and 18 are again connected to jack contacts 14 and 10, respectively, and with the drivers' output voltages near ground, V5 is pulled low via S5 and S6. $V_{ref}$ is made greater than ground such that when V5>0 volts, the output CMP3OUT of CMP3 is a logic low. Controller 38 is arranged to interpret this as meaning that the plug is removed from J1. Once the removal of a plug has been detected, controller 38 returns the circuit to its initial state, setting switches. S1–S6 in accordance with Table 1, above, to detect the insertion of a plug into J1.

If the plug-in device has been determined to be a telephone headset with the ring of the plug connected to a microphone and the tip of the plug connected to a sound transducer (CMP1OUT low, CMP2OUT high), the switches are set in accordance with Table 4:

TABLE 4

| | |
|---|---|
| S1 | open |
| S2 | open |
| S3 | open |
| S4 | open |
| S5 | open |
| S6 | closed |

When a headset of this type is detected, interface circuitry 40 connects a microphone amplifier to jack contact 14 and a driver circuit to jack contact 10. Microphones often require a pull-up voltage to operate, which would be provided by the microphone amplifier. Therefore, S5 is kept open to isolate V5 from the microphone amplifier. However, S6 is closed, so that the headphone driver output voltage pulls V5 down via S6 when the plug is removed. As noted above, this makes CMP3OUT of CMP3 a logic low, which controller 38 interprets as meaning that the plug has been removed from J1. Once the removal of the plug is detected, controller 38 returns the circuit to its initial state, setting switches S1–S6 in accordance with Table 1, above, to detect the insertion of a plug into J1.

If the plug-in device has been determined to be a telephone headset with the tip of the plug connected to a microphone and the ring of the plug connected to a sound transducer (CMP1OUT high, CMP2OUT low), the switches are set in accordance with Table 5:

TABLE 5

| | |
|---|---|
| S1 | open |
| S2 | open |
| S3 | open |
| S4 | open |
| S5 | closed |
| S6 | open |

This is identical to the situation described above in relation to Table 4, except that now S5 and is closed and S6 is opened, so that the microphone amplifier connected to jack contact 10 is isolated from V5, and the headphone driver circuit connected to jack contact 14 is connected to V5. As above, this pulls V5 down (via S5) when the plug is removed, making CMP3OUT of CMP3 a logic low, which controller 38 interprets as meaning that the plug has been removed from J1. Once the removal of the plug is detected, controller 38 returns the circuit to its initial state, setting switches S1–S6 in accordance with Table 1, above, to detect the insertion of a plug into J1.

Note that the circuit of FIG. 3 is merely exemplary. Numerous circuits could be employed to compare the electrical characteristics of two or more circuits contained in a device plugged into a particular jack, and to produce an output which varies with the result of the comparison. Though the example discusses comparing only two circuits within the plug-in device, the concept is easily adapted to three or more circuits. For example, the plug-in device may be a headset having a microphone and both left and right sound transducers. This requires a 4-contact plug and corresponding 4-contact jack, each with 3 non-common contacts and one common contact. In this case, the switching network is connected to each of the non-common contacts and the controller is arranged to configure the switching network such that a selected electrical characteristic of each of the plug-in device's circuits can be compared against each other.

Figure 4A:
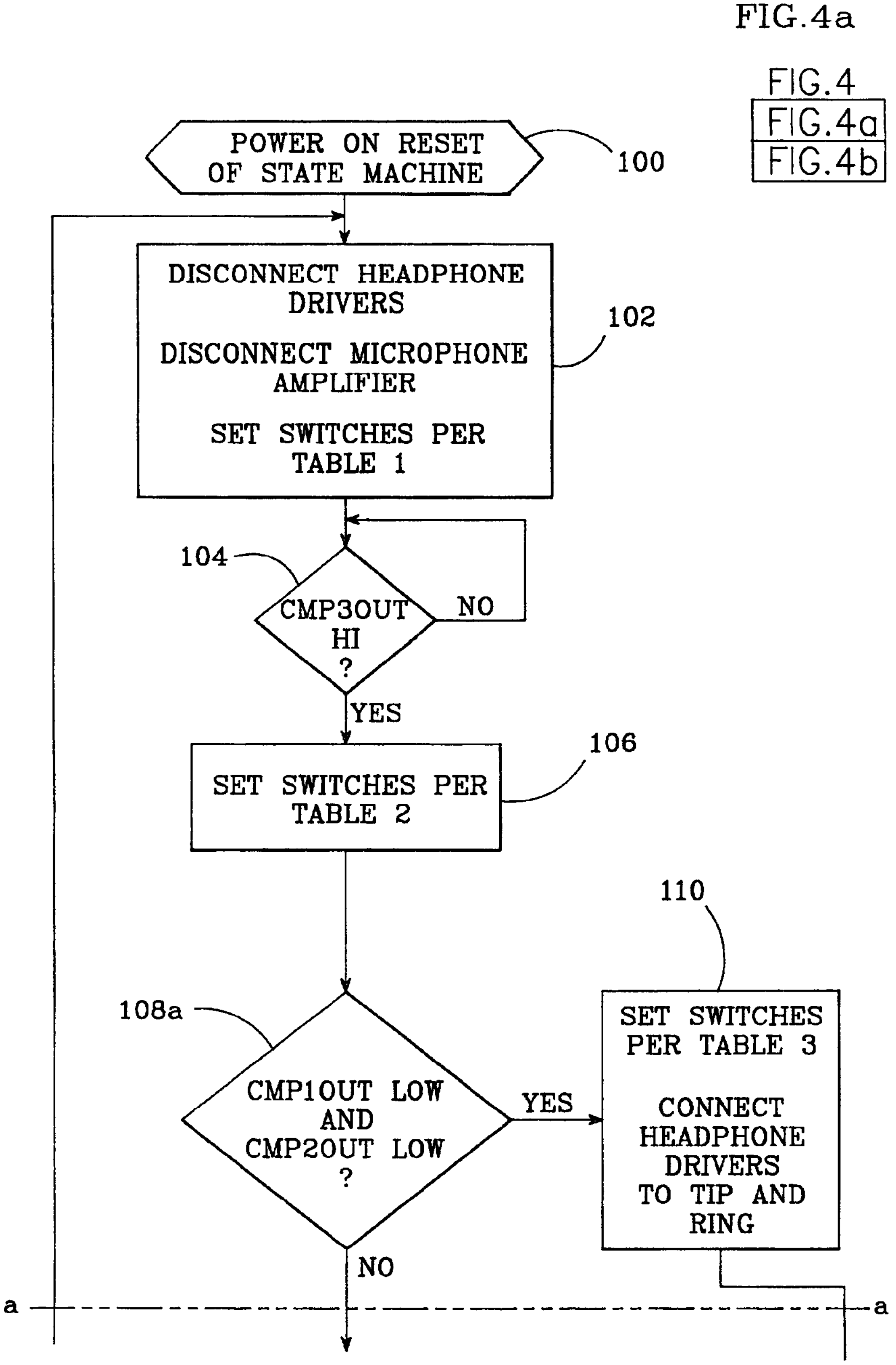
FIG. 4 is a flow chart describing the operation of a state machine which might be used with the present invention.
Figure 4B:
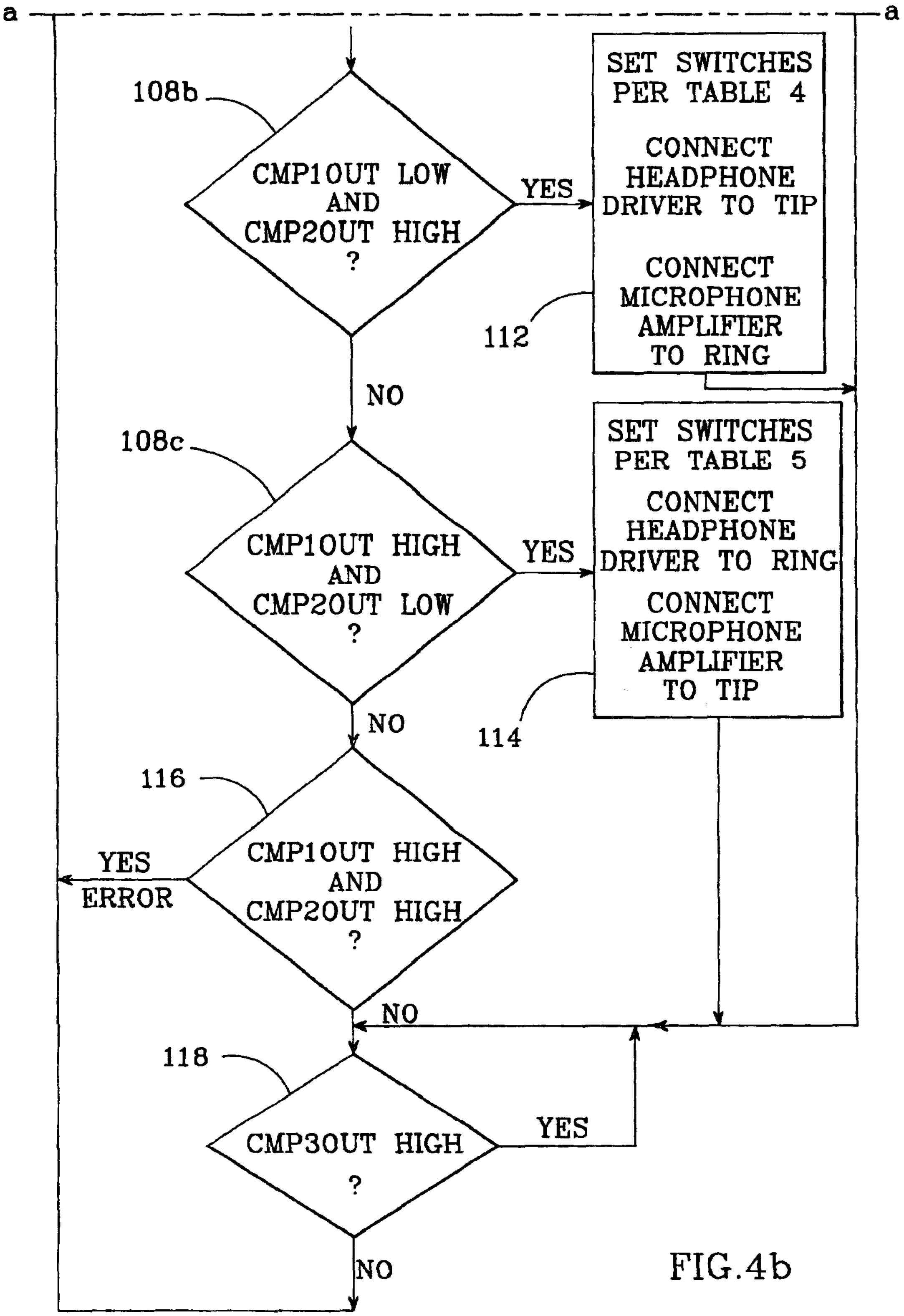

Controller 38 can be implemented in several ways. For example, the controller can be a microprocessor which is programmed to operate the switching network and interface circuitry and to interpret the comparison circuit output. Alternatively, controller 38 can be a simple state machine. A state machine flow chart (which could also serve as a software flow chart for a microprocessor-based controller) suitable for use with the discrimination circuit shown in FIG. 3 is shown in FIG. 4. The state machine enters an initialization state when powered up (step 100), which puts the interface circuitry into an initial state, and sets switches S1–S6 per Table 1 (step 102). The state machine then continuously monitors the value of CMP3OUT (104), and when it goes high, indicating that a plug has been inserted into J1, switches S1–S6 are set per Table 2 (step 106).

The state machine then discerns the logic levels of CMP1OUT and CMP2OUT (steps 108*a*, 108*b*, and 108*c*). If CMP1OUT and CMP2OUT are both low, switches S1–S6 are set per Table 3 and interface circuitry 40 configured accordingly (step 110). If CMP1OUT is low and CMP2OUT is high, S1–S6 are set per Table 4 and interface circuitry 40 configured accordingly (step 112). And if CMP1OUT is high and CMP2OUT is low, S1–S6 are set per Table 5 and interface circuitry 40 configured accordingly (step 114). The state machine can be further arranged to detect if both CMP1OUT and CMP2OUT are high (step 116). As no expected condition produces this result, the state machine can be arranged to interpret this as an error.

Once the type of plug-in device has been determined, the state machine continuously monitors the value of CMP3OUT (118), and when it goes low, indicating that the plug has been removed from J1, the state machine returns to the initialization state and sets switches S1–S6 per Table 1 (step 106).

Note that the state machine flow chart of FIG. 4 is merely exemplary. A discrimination circuit in accordance with the present invention could be implemented in many different ways and with many different process flows. It is only essential that the circuit be arranged to compare an electrical characteristic associated with two or more circuits within a plug-in device, and to produce an output which indicates the results of the comparison.

While particular embodiments of the invention have been shown and described, numerous variations and alternate embodiments will occur to those skilled in the art. Accordingly, it is intended that the invention be limited only in terms of the appended claims.

We claim:

1. A plug-in device discrimination circuit suitable for connection to a jack having at least three contacts and arranged to mate with a corresponding plug connected to a plug-in device which contains at least two circuits which each have an associated electrical characteristic, at least two of said jack contacts connected to respective ones of said at least two plug-in device circuits via said plug when said plug is mated with said jack, said discrimination circuit comprising:

a comparison circuit which, when connected to said jack contacts and said plug is mated with said jack, is arranged to compare the electrical characteristics of at least two of said plug-in device circuits, and to produce an output which varies with the results of said comparison, a switching network arranged to route signals between said comparison circuit and said jack contacts, and a controller arranged to control said switching network such that said comparison is enabled and said comparison circuit output is produced.

2. The discrimination circuit of claim 1, wherein said controller is a state machine.

3. The discrimination circuit of claim 1, wherein one of said at least three jack contacts is a common contact and said associated electrical characteristic is the resistance of the plug-in device circuit connected between each of said non-common contacts and said common contact.

4. The discrimination circuit of claim 1, wherein one of said at least three jack contacts is a common contact and said associated electrical characteristic is the impedance of the plug-in device circuit connected between each of said non-common contacts and said common contact.

5. The discrimination circuit of claim 1, wherein one of said at least three jack contacts is a common contact and said associated electrical characteristic is the conductance of the plug-in device circuit connected between each of said non-common contacts and said common contact.

6. The discrimination circuit of claim 1, further comprising interface circuitry arranged to receive signals from and/or provide signals to said plug-in device via said jack contacts when said plug is mated with said jack.

7. The discrimination circuit of claim 1, wherein said discrimination circuit is further arranged to detect when a plug has been inserted into said jack and when said plug has been removed from said jack.

8. The discrimination circuit of claim 7, wherein said controller is arranged to initially arrange said switching network such that said comparison circuit detects when a plug has been inserted into said jack, to arrange said switching network such that said comparison is performed, and to arrange said switching network such that said comparison circuit detects when said plug has been removed from said jack.

9. A plug-in device discrimination circuit, comprising:

a jack having at least three contacts and which is suitable for mating with a plug connected to a plug-in device which contains at least two circuits, one of said contacts being a common contact, each of said plug-in device circuits connected to one of said non-common contacts when said plug and jack are mated and having a respective electrical resistance between its non-common contact and said common contact, a comparison circuit connected to said jack contacts and arranged to compare the associated resistances of at least two of said plug-in device circuits, and to produce an output which varies with the results of said comparison, a switching network arranged to route signals between said comparison circuit and said jack contacts, and a controller arranged to control said switching network such that said comparison is enabled and said comparison circuit output is produced.

10. The discrimination circuit of claim 9, wherein said at least two circuits of said plug-in device comprise left and right sound transducers and said plug-in device is stereo headphones.

11. The discrimination circuit of claim 9, wherein said at least two circuits of said plug-in device comprise a microphone and at least one sound transducer and said plug-in device is a telephone headset.

12. The discrimination circuit of claim 9, wherein said jack and said mating plug each have four contacts and said at least two circuits of said plug-in device comprise a microphone and left and right sound transducers, said microphone, said left sound transducer, and said right sound transducer connected to respective ones of said plug's non-common contacts, said plug's fourth contact serving as a common contact.

13. The discrimination circuit of claim 9, wherein said jack is a standard 2.5 mm three contact jack.

14. The discrimination circuit of claim 9, wherein said controller is further arranged to receive said comparison circuit output, further comprising one or more driver circuits and/or amplifiers which are switchably connected to said jack contacts by said controller in response to said comparison circuit output.

15. The discrimination circuit of claim 9, wherein said controller is a state machine.

16. The discrimination circuit of claim 15, wherein said state machine is arranged to:

initialize said switching network to enable said comparison circuit to detect when a plug has been inserted into said jack, configure said switching network to enable said comparison circuit to perform said comparison and produce said comparison circuit output, and configure said switching network to enable said comparison circuit to detect when said plug has been removed from said jack.

17. The discrimination circuit of claim 16, further comprising one or more driver circuits and/or amplifiers which are switchably connected to said jack contacts by said state machine in response to said comparison circuit output, wherein said state machine is further arranged to:

connect respective driver circuits to said non-common contacts when the output of said comparison circuit indicates that the associated resistances of at least two of said plug-in device circuits are about equal, connect a driver circuit and an amplifier circuit to respective ones of said non-common contacts when the output of said comparison circuit indicates that the associated resistances of at least two of said plug-in device circuits are substantially different.

18. The discrimination circuit of claim 9, wherein said comparison circuit comprises:

a first current source which is connected to apply a first current to a first one of said non-common jack contacts via said switching network such that a first voltage V1 is developed which varies with the resistance of the plug-in device circuit connected to said first non-common jack contact found between said first non-common jack contact and said common contact, a second current source which is connected to apply a second current to a second one of said non-common contacts via said switching network such a second voltage V2 is developed which varies with the resistance of the plug-in device circuit connected to said second non-common jack contact found between said second non-common jack contact and said common contact, one or more comparators arranged to receive first and second signals which vary with V1 and V2, respectively, and to produce one or more outputs which indicate whether $V1 \approx V2$, $V1 < V2$, or $V1 > V2$, said comparator outputs being said comparison circuit output.

19. The discrimination circuit of claim 18, wherein said comparison circuit further comprises a comparator having a first input connected to a reference voltage and a second input switchably connected to one or more of said jack contacts via said switching network such that the output of said comparator indicates the presence or absence of a plug in said jack.

20. The discrimination circuit of claim 9, wherein said comparison circuit comprises:

a first current source connected to apply a first current to a first one of said non-common jack contacts via said switching network such that a first voltage V1 is developed which varies with the resistance of the plug-in device circuit connected to said first non-common jack contact found between said first non-common jack contact and said common contact, a second current source connected to apply a second current to a second one of said non-common contacts via said switching network such that a second voltage V2 is developed which varies with the resistance of the plug-in device circuit connected to said second non-common jack contact found between said second non-common jack contact and said common contact, an operational amplifier connected to amplify V1 with a gain>1, the output of said operational amplifier providing a first reference voltage $V_{ref1}$, a divider network arranged to divide down the value of $V_{ref1}$ and thereby provide a second reference voltage $V_{ref2}$ which varies with $V_{ref1}$, a first comparator connected to receive said $V_{ref1}$ at one input and V2 at a second input and to produce an output which indicates if $V_{ref1}>V2$ or $V_{ref1}<V2$, a second comparator connected to receive said $V_{ref2}$ at one input and V2 at a second input and to produce an output which indicates if $V_{ref2}>V2$ or $V_{ref2}<V2$, said operational amplifier gain, said divider network, and said comparators arranged such that said comparator outputs indicate whether $V1\approx V2$, $V1<V2$, or $V1>V2$, said comparator outputs being said comparison circuit output.

21. A method of discriminating between types of plug-in devices, each of which can be mated with a particular jack, comprising:

detecting when a plug is inserted into a jack having a common contact and at least two non-common contacts, applying respective currents to each of said non-common contacts, comparing the respective voltages that appear at each of said non-common contacts in response to said applied currents, and producing an output which indicates the equality relationships between said respective voltages.

22. The method of claim 21, wherein said jack has two non-common contacts and said respective currents are applied to each of said non-common contacts to produce respective voltages V1 and V2, said output indicating whether $V1\approx V2$, $V1<V2$, or $V1>V2$.

23. The method of claim 21, further comprising connecting appropriate interface circuitry to said jack contacts in response to said output.

24. The method of claim 23, wherein said interface circuitry comprises a pair of sound transducer drivers when said output indicates that said voltages are about equal, and said interface circuitry comprises one sound transducer driver and one microphone amplifier when one of said voltages is greater than the other of said voltages.

* * * * *